United States Patent
Aloe

(10) Patent No.: US 9,203,245 B2
(45) Date of Patent: Dec. 1, 2015

(54) BATTERY AND CHARGER KIOSK

(71) Applicant: John Aloe, Denver, CO (US)

(72) Inventor: John Aloe, Denver, CO (US)

( * ) Notice: Subject to any disclaimer, the term of this patent is extended or adjusted under 35 U.S.C. 154(b) by 349 days.

(21) Appl. No.: 13/917,249

(22) Filed: Jun. 13, 2013

(65) Prior Publication Data

US 2014/0368156 A1 Dec. 18, 2014

(51) Int. Cl.
*H02J 7/00* (2006.01)

(52) U.S. Cl.
CPC ............. *H02J 7/0003* (2013.01); *H02J 7/0027* (2013.01); *H02J 7/0042* (2013.01)

(58) Field of Classification Search
CPC ...... H02J 7/0003; H02J 7/0027; H02J 7/0042
USPC .......... 320/106, 107, 109, 110, 112, 113, 115
See application file for complete search history.

(56) References Cited

U.S. PATENT DOCUMENTS

| | | | |
|---|---|---|---|
| 4,433,278 A | 2/1984 | Lowndes et al. | |
| 8,269,453 B2 | 9/2012 | Ludtke | |
| 8,355,965 B2 | 1/2013 | Yamada | |
| 2008/0281732 A1* | 11/2008 | Yamada | 705/30 |
| 2012/0246083 A1 | 9/2012 | Bowles et al. | |
| 2012/0254046 A1 | 10/2012 | Librizzi et al. | |
| 2013/0026973 A1* | 1/2013 | Luke et al. | 320/106 |
| 2013/0063073 A1* | 3/2013 | Kawasaki et al. | 320/101 |

* cited by examiner

*Primary Examiner* — Richard Isla Rodas
*Assistant Examiner* — Nathaniel Pelton
(74) *Attorney, Agent, or Firm* — Lambert & Associates; Gary E. Lambert; David J. Connaughton, Jr.

(57) ABSTRACT

A battery rental kiosk system is provided. The system allows for batteries to be rented or purchased for mobile devices that may require a battery recharge. In one embodiment, the system may allow a customer to rent the battery for a selected time period and charge a customer credit card periodically at the expiration of the time period.

20 Claims, 4 Drawing Sheets

BATTERY AND CHARGER KIOSK

BACKGROUND OF THE INVENTION

1. Field of the Invention

The present invention relates generally to battery vending systems. More particularly the present invention relates to a kiosk system and kiosk management system for renting and/or purchasing battery packs configured to recharge a battery of a portable electronic device.

2. Description of Related Art

The recent rapid advance of technology has promoted a reduction in size and weight and an increase in functionality of portable electronic devices. Accordingly, the penetration rate of those devices has dramatically increased. Particularly, mobile phones show remarkable progress. In mobile phones, not only making calls but a variety of usage methods are enabled such as sending and receiving E-mails, viewing Web information, taking pictures and movies, watching and listening to TV and radio, listening to music, etc., downloaded through a line, managing a user's schedule, and executing software such as built-in games or games obtained by download. In addition to the above, cordless technology for portable electronic devices such as notebook computers, PDAs, digital cameras, tablet computers, video cameras, and electronic books and electrical devices and electronic devices such as cordless cleaners, electric-assist bicycles, and electric vehicles is advancing.

In order to drive such devices, batteries which can be repeatedly charged and recharged are used. Particularly, by the appearance of nickel metal hydride batteries and lithium-ion batteries, a reduction in size and weight of batteries is promoted and an increase in capacity of batteries is implemented, significantly contributing to a reduction in size and weight and an increase in functionality of devices.

However, even though the capacity of batteries is increased in response to demands for a reduction in size and an increase in functionality of devices, there is a limit to battery storage power and thus under the present circumstances, a user uses a battery while worrying about the amount of charge remaining in the battery. There may be a case in which when a user is away from home or office, the amount of charge remaining in a battery is used up and accordingly the battery is dead while a device is in use, disabling the use of the device. Some users charge batteries using chargers and some users carry their chargers at all times and charge batteries in a place where there is a wall outlet. However, it is inconvenient to carry chargers at all times.

Therefore, what is needed is a system that may allow users to conveniently charge the batteries of their devices in a portable and easily accessible manner.

SUMMARY OF THE INVENTION

The subject matter of this application may involve, in some cases, interrelated products, alternative solutions to a particular problem, and/or a plurality of different uses of a single system or article.

In one aspect, a battery exchange service system is provided. The system comprises a kiosk in electronic communication with a server, and a charging unit capable of charging battery packs exchanged by the system. The kiosk comprises a computerized user interface module that provides a user interface to a customer. The user interface module allows a user to identify one or more of a plurality of battery packs based on the desired device to be charged. The user interface module then guides the customer through the rental or purchase process including selecting a rental time period (if applicable) and payment. The kiosk may contain a plurality of different battery pack configurations allowing for flexibility of chargeable items. The varied configurations may be achieved by adapters and one type of battery pack, or by a number of different battery packs specially configured to charge a particular device.

The kiosk further has a dispensing structure that allows the identified battery pack to be vended to the customer. A return structure of the kiosk has an openable door and a sensor that allows a customer to return a rented battery pack, and allows the kiosk to identify the returned battery pack. The returned batteries are stored in a return battery pack bin which is connected to the return structure. An operator may access the returned battery pack bin and move them to the charging unit, which may be in the kiosk, or external. Further, a sensor may identify that a battery pack has been returned through the return structure. For example, the sensor may sense that a battery pack or packs are received in the return structure.

In an alternative embodiment, instead of a return battery pack bin, a battery replacement unit may be employed. The battery replacement unit does not require an operator, and is capable of automatically placing the returned battery pack into a charging unit located within the kiosk. In this embodiment, an operator is not required and the returned batteries are immediately charged and prepared for re-vending.

The server may comprise a core services module, and administration repository module, an analytics repository module, and an administrator and analytics reporting module.

The core services module is configured to receive the information provided by the communications unit, and further configured to process credit card information. The administration repository module is configured to store and receive information relating to a history of the renting of the plurality of battery packs. The core services module passes the identification number and a kiosk identification number to the administration repository module. The analytics repository is configured to calculate and store analytics information regarding kiosk operation based on the information received by the core services module. The administrator and analytics reporting module is configured to provide a user interface and access to the server system. This module allows an administrator to access data of the analytics repository, administration repository module, and the core services module.

Further, the core services module of the server is configured to charge the credit card of the customer based on the credit card information, and is configured to begin a timer for the selected time period. Upon expiration of the selected time period charge the credit card of the customer again, and restart the time for the selected time period. This charging may repeat until the item is returned, or may repeat until either the item is returned, or once the customer has paid a predetermined amount, essentially purchasing the battery pack.

DETAILED DESCRIPTION

Figure 1:
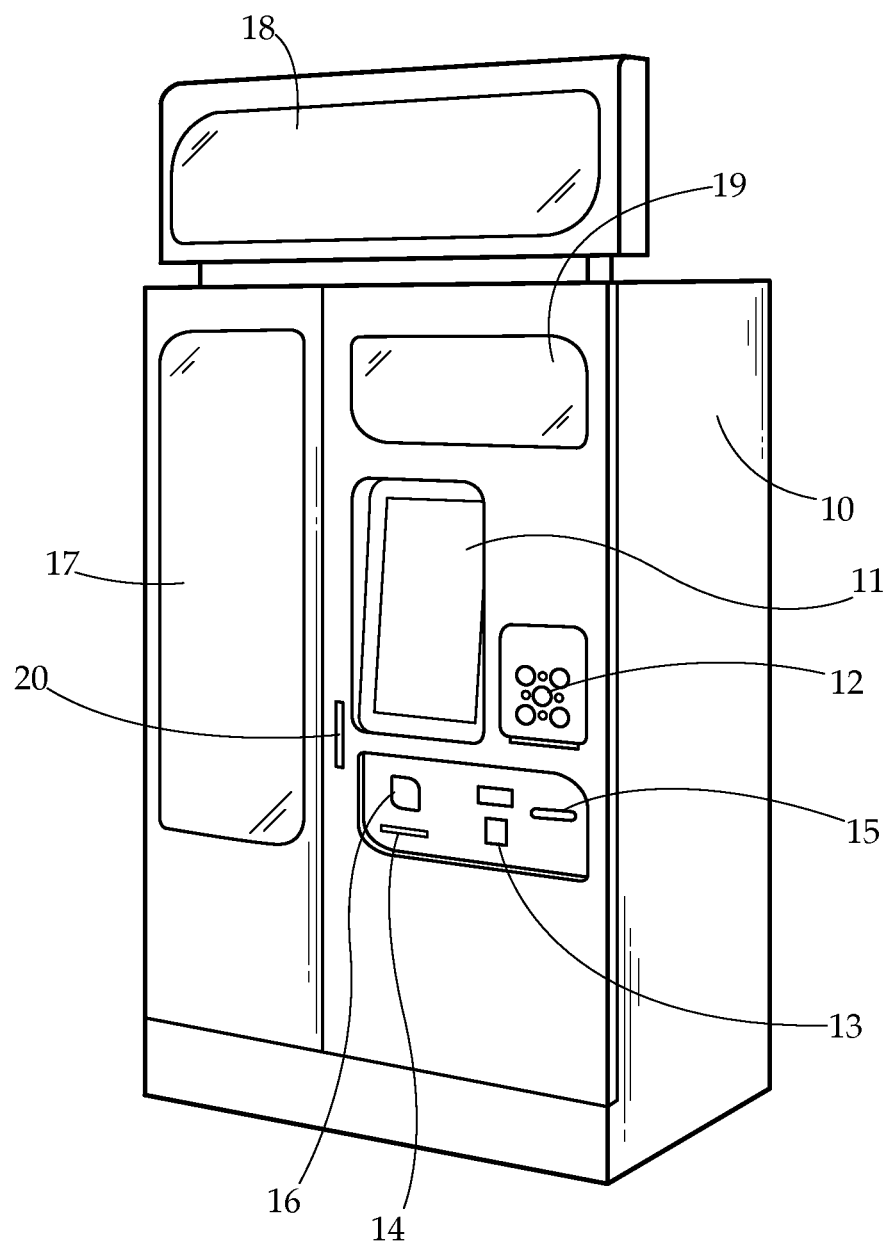
FIG. 1 provides a perspective view of an embodiment of a kiosk

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention involves one or a plurality of battery pack vending kiosks, and a central server system that controls the kiosks and tracks inventory status, sales, and the like.

The kiosk is configured to vend battery packs. The battery packs may be any portable source of electricity capable of transferring the electric charge to a battery of a portable device. In one embodiment, the battery pack may comprise standard battery one of a plurality of removable adapters attachable to the battery, thereby allowing one battery to be used with any number of different devices. In another embodiment, the kiosk may comprise a plurality of different battery pack types, each type configured to charge a different device. For example, the Kiosk may have a plurality of battery packs configured to charge an iPhone®, a plurality of battery packs to charge Samsung® devices, and a plurality of battery packs to charge LG® devices, and so on. In still another embodiment, different battery packs and/or different adapters may be used depending on electronic needs of a device. In yet another embodiment, the battery packs may be configured as "Power Banks" capable of providing a charge to the device requiring charging.

The kiosk may have a computerized user interface module to allow a user to select the type of device they have that requires charging, via a touch screen or other computerized interface. In this manner the kiosk may be configured to receive this input and select the proper charging equipment to vend. The identified battery packs may then be vended through a vending structure such as a drawer, slot, aperture, or the like. In embodiments wherein an adapter is used to connect the battery to the electronic device, the kiosk may retrieve a battery from a battery storage, and may retrieve the required adapter from an adapter storage, and vend the two together. The kiosk user interface module may allow a user to search and select the proper battery pack in any manner, including browsing by photos of the device to be charged, alphabetical listing of item to be charged, technical specifications of the pack and/or adapter, and the like.

The kiosk may be configured with a user interface module that allows a user to identify the required battery pack for charging their device. The interface may be operable as a touch screen, a plurality of buttons, voice interface, mouse or track pad controlled, keyboard controlled, optically controlled, and the like.

Within the kiosk, the batteries to be vended and/or adapters may be organized in a vending rack, allowing a mechanized dispenser to identify the appropriate item to be vended and to dispense it. Further, upon a return of a used battery pack, the kiosk may store the packs in a returned battery pack bin, allowing an operator to receive them and recharge them. In this embodiment, operators may manually remove the returned battery packs and take them to a location for recharge on a charging unit, maintenance, tracking, and the like. In another embodiment, operators may retrieve the returned battery packs, and place them in the vending rack or a charging unit within the kiosk to be charged and vended. The positions on the vending rack may provide charging to the batteries to keep them in a charged condition, or the charging unit may be capable of physically moving the charged battery packs to the vending rack.

In another embodiment, the kiosk may automatically store the returned packs in a charging unit using a battery replacement unit to provide automated recharging. In a further embodiment, the charging unit may be the vending rack. The battery replacement unit may be any structure capable of moving the returned battery pack to the charging unit for charging. This may be a mechanical arm or similar structure, a movable charging unit orientable to charge the returned battery, or the like.

The charging unit for the battery packs may be any charging structure capable of charging and storing the battery packs. In one embodiment, the charging unit may store the battery packs and continually provide a charging source. In another embodiment, the charging may be performed until the battery pack is fully charged and then the charging may stop, either by ceasing to provide a charge or by physically moving the battery pack from the charging unit to the vending rack.

In one embodiment, the kiosk may be configured to allow purchase of the battery packs. In another embodiment, the kiosk may be configured to allow a rental of the battery packs on a time based rate. For example, the kiosk may rent daily, hourly, half-daily, or the like. Further, the kiosk system may automatically charge a client while the battery pack is not returned. In a further embodiment, the renting and charging may stop after a certain time once the client has been charged a cost of the battery pack plus a profit.

In operation, the battery pack and/or adapter may be vended through the dispensing structure in any manner capable of removing the battery pack from the vending rack and delivering it to a client. In one embodiment, a mechanical arm may grab a pack, remove it from the vending rack, and place it in an outlet for a client to take. In another embodiment, the vending rack may be movable over an outlet, and the selected battery pack may be ejected from the rack when in position over the outlet. In still another embodiment, a battery pack may be dropped or lowered onto a conveyor or chute which directs the battery pack to the outlet. The outlet may be any structure that allows the battery pack to exit the kiosk.

In one embodiment, a customer engagement module may display on a screen of the kiosk to aid in customer engagement. The display by the customer engagement module may be a promotional service, may demonstrate how to use the kiosk or how the system operates, or may be an advertisement. The customer engagement module may run until a customer initializes the system by activating the interface, such as by touching a touch screen, pressing a button, activating a mouse, or the like.

In a particular embodiment, once the interface is activated, the system may display an inventory level based on the number of battery packs capable of being vended (i.e. charged and ready) for each device or device category. Further, once the interface is activated, the system may inform the customer if the kiosk is experiencing any difficulties.

If the kiosk has adequate inventory, and is working properly, the kiosk may display a welcome menu screen, allowing a customer to rent, buy, and/or return a battery pack. The user interface module contemplated herein may be intuitive and easily guide a customer through the process.

In one embodiment, a shopping module of the user interface may guide a user through the shopping process to either rent or buy a battery pack suitable for charging the device of their choosing. In this embodiment, the kiosk may display a screen allowing a user to decide how they would like to look up their product to identify the proper battery pack to vend. In one embodiment, the device may be selected by browsing by category or the like. In another embodiment, the device may be selected by typing in the product name. Either embodiment may yield a list of products narrowed down by the users selection as the device is progressively narrowed down through selection.

In one embodiment, the listed devices may be displayed including any of the product name, image, manufacturer, corresponding battery pack specifications, adapter specifications, and the like. Further, the kiosk user interface module may allow for a customer to select a device to view more detailed specifications.

Once the device is selected, the user may select either renting or buying of the battery pack, and further may continue shopping in the event that more than one battery pack is desired. Based on the rental or buying selection, the kiosk will display the price for the item.

Once the customer has finished shopping, they may review their order by having it displayed on the kiosk screen, and then make the purchase in exchange for the battery packs. Upon payment, the battery packs may be dispensed through the dispensing structure to the user.

In one embodiment, the kiosk may be configured to receive a coupon entry to provide a discount to the customer. The coupon may be used as an incentive for new customers, or as a reward for loyal customers, among other things. The coupon may be entered in any manner into the kiosk system, such as by scanning a physical coupon, entering a coupon code, and the like. The kiosk user interface module may actively prompt a user for a coupon entry, or may passively provide it as an entry option in the user interface.

In one embodiment, the kiosk, which is in electronic connection with the server, may send the coupon information to the server for verification and/or validation of the coupon. If the server returns an invalid response to the kiosk, the kiosk user interface will inform the user and either prompt them to enter another coupon, or prompt them to proceed to checkout. If the server confirms that the coupon is valid, the kiosk system may apply the discount and proceed to checkout and delivery process.

A checkout process may be performed by the kiosk system in any manner capable of providing currency in exchange for the battery packs. In one embodiment, the kiosk may have a credit card reader to process payments. The user interface module may guide the user through the checkout process. Upon received payment, the kiosk may then dispense the selected battery packs and/or adapters. A receipt printer may print a receipt upon dispensing of the selected battery pack. The receipt may confirm payment, provide return date, provide information relating to rental or purchase terms, and the like.

In one embodiment, scanned credit card information may be sent from the kiosk to the server for processing. In another embodiment, credit card processing may be performed by the kiosk or a networked connection between the kiosk and an outside credit card processing service.

Further, the kiosk or server may be configured, in the case of a rental, to charge the credit card after a given time period for additional rented time. For example, a new charge to the credit card may be applied per day, per hour, or the like, until returned. In a further embodiment, the period charges may end after a certain time, and the customer may be considered to have purchased the battery pack. For example after a customer has been charged the cost of the battery pack plus a convenience charge, the charging of the credit card may cease. In an alternative embodiment, the charge may be applied to the card once the battery pack is returned, or once the time frame for purchase has been reached.

In a renting embodiment, the kiosk may be configured to receive and process returned battery packs through a return structure. In one return process embodiment, a rented battery pack may have a scannable marking such as a bar code, and the kiosk may instruct a customer to scan that marking using a scanner. Upon receipt of the scanned information by the kiosk, the kiosk may communicate with the server to request information linked to the product scanned. The server may then confirm that it is a correct product to be returned, and information relating to the rental.

In one embodiment, the kiosk may have a return structure that is an openable door that allows the battery pack and/or adapter to be returned, processed and stored. Once the kiosk detects the returned product, it may communicate to the server that the product is returned. Once the server confirms, the kiosk may provide an output to the customer that the return has successfully been completed. It should be understood that the return structure may be any structure that allows return of the battery packs.

In one embodiment, the system may operate with multiple kiosks, and may allow a customer to rent a battery pack from one kiosk and return it at another. This embodiment may be particularly useful for travelling. For example, in an airport, train station, or bus station, customers could rent the battery pack to recharge a battery of their device during travel, and then may return the battery pack to a different kiosk at their destination.

As briefly noted, the kiosk may be in electronic, networked communication via a communication unit with a server system, along with a plurality of other kiosks. The server system may provide a centralized source for information storage regarding inventory, transactions, kiosk status, and the like. Further, the server system may provide credit card processing, tracking, control of individual kiosks, and the like.

The server system may be located on a remote computer, and may communicate with the kiosks over the internet or similar networked communication.

In one embodiment, the server may remotely control one of a plurality of kiosks. This control may involve inventory checking, software updating, troubleshooting, product sales and return, review and monitoring of current process and recent processes, and the like.

In a further embodiment, the server may control a mode of the kiosk, and be capable of switching the kiosk from a normal sales mode, an unavailable mode when the kiosk is not properly functioning, and a maintenance mode allowing maintenance on the kiosk, either by the server or by an operator physically working on the kiosk.

In still a further embodiment, the server may be configured to gather data from the plurality of kiosks and use analytics to track sales, returns, inventory patterns, and the like to provide data tied to the transactions and usage of various kiosks. These analytics may allow for the evaluation and viewing of trends, effectiveness, and the like of the kiosks, either individually, as a whole, or in certain areas or conditions.

Further, the server may be configured to control the charging, recharging, and positioning of the battery packs, and may control aspects of the kiosk such as activating a charging of a battery pack, deactivating of the charging of the battery pack, movement of the battery pack from a return area, to a charging unit, to a vending rack, and the like.

Figure 2:
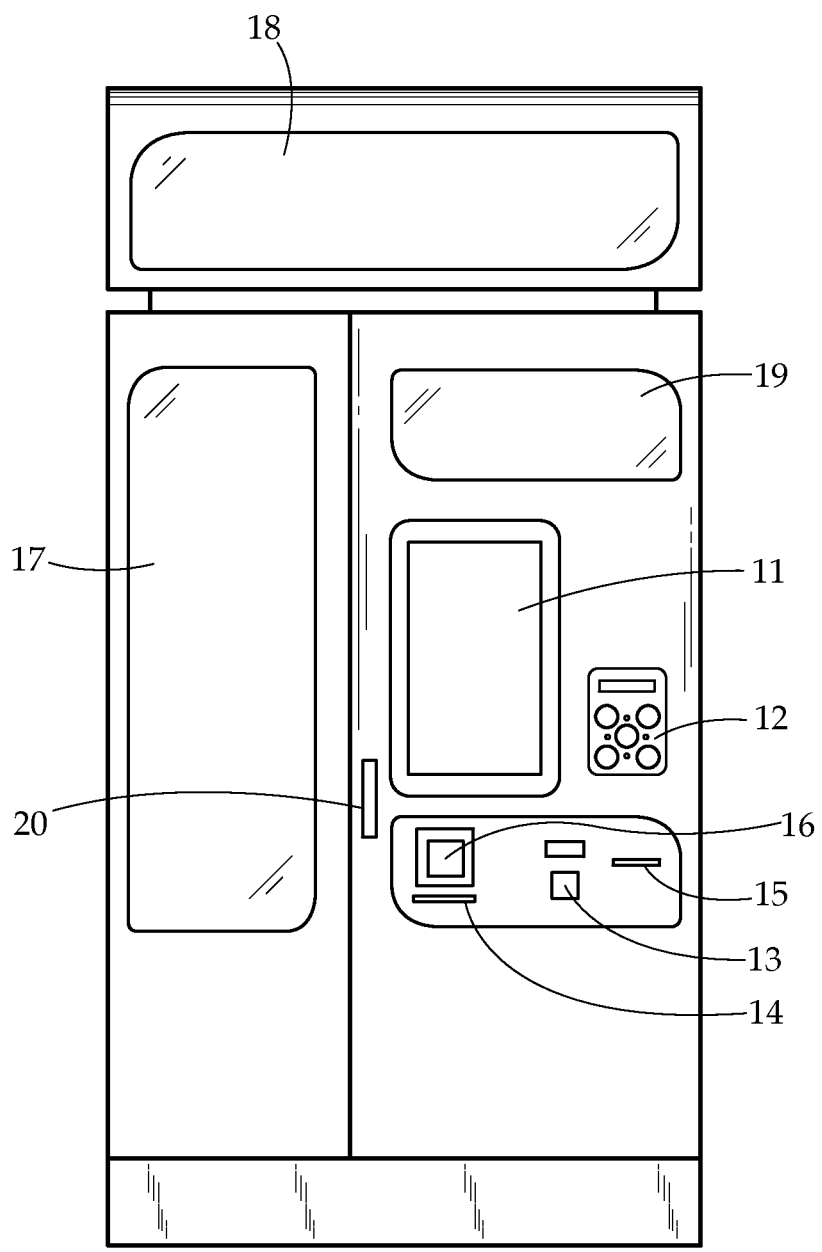
FIG. 2 provides a front view of an embodiment of a kiosk

Turning now to FIGS. 1 and 2, a perspective view and frontal view, respectively, of a kiosk is provided. The kiosk 10 comprises a touch screen 11 that allows a user to interact with a user interface module and control the system. Once a user has selected the proper battery pack, which may be a stand alone pack or a battery and a removable adapter, the user may pay using credit card reader 15, and receive the selected battery pack from dispensing structure, shown here as a door 12. A receipt printer 14 may further print a receipt for a customer upon check out. Upon return of a rented battery pack, a user may scan the pack and/or the receipt using scanner 13. The kiosk 10 may then communicate with a server (not shown) to confirm that the scanned pack is a proper pack to be returned. Once this is confirmed, the kiosk screen 11 may prompt a user to return the battery pack into the return structure, shown here as a slot 16.

A handle 20 is positioned on the front of the kiosk to allow an operator to access internal mechanisms of the kiosk, such as returned battery packs (not shown), the vending rack (not shown), the charging unit if present (not shown), and any mechanics required to move and/or dispense the battery packs. The kiosk may further have spaces 17, 18, 19 for advertisements, information, instructions, and the like.

Figure 3:
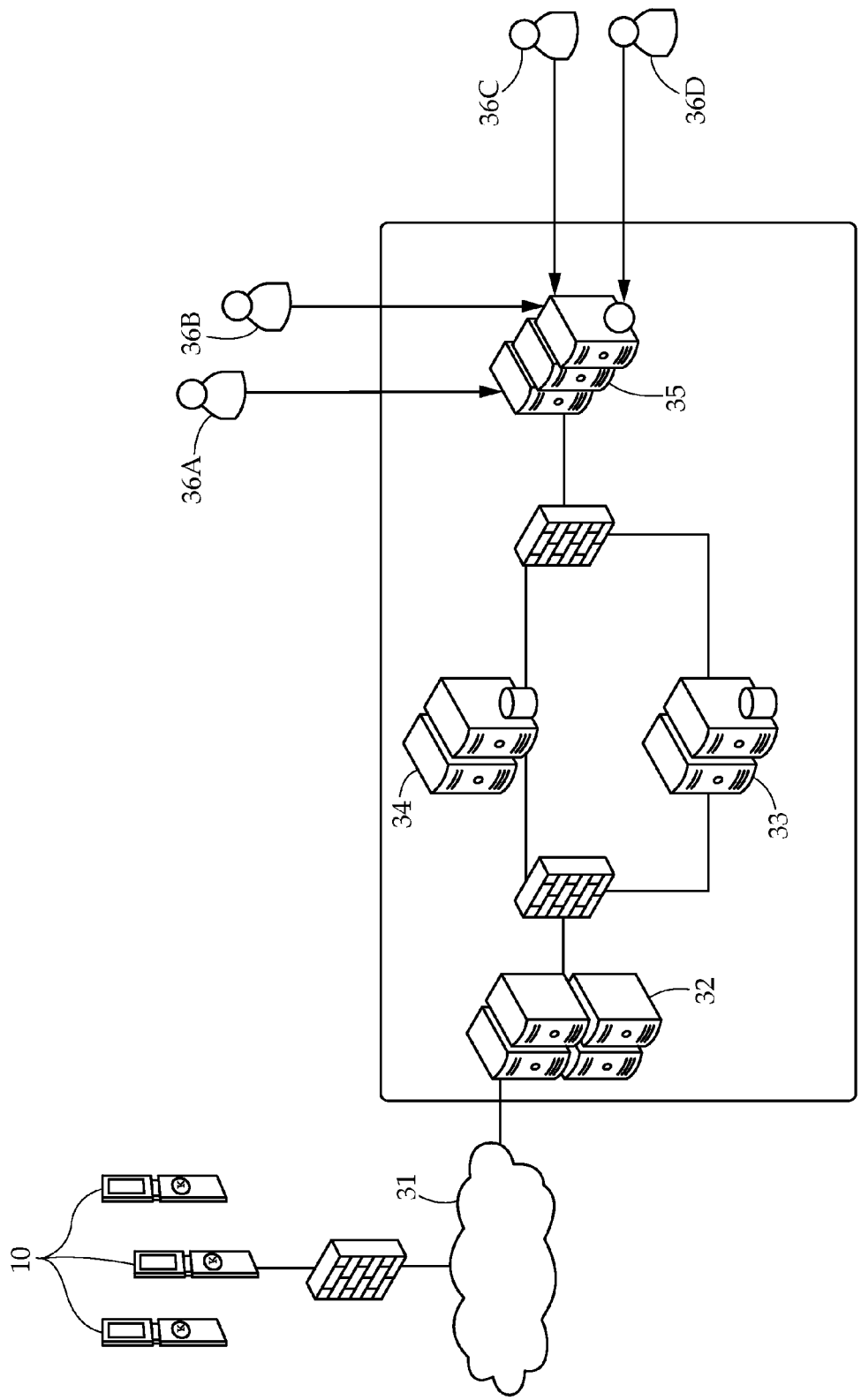
FIG. 3 provides a schematic view of an embodiment of the kiosk and server layout.

FIG. 3 shows a flow chart of the control and operation of the server system with respect to the kiosks. Kiosks 10 are in networked communication 31 with server system 30. Within the server system is a core services module 32 which provides control and monitoring of the kiosks 10, as well as confirmation services during return and credit card processing. An administration repository module 34 stores administrative information, tracking information on rented and sold products, and kiosk data. An analytics repository module 33 may store analytics information to analyze and adjust kiosk operation and location to optimize efficiency. An administrator and analytics reporting module 35 provides user interface and access to the server system. The user access may be an analytics user 36B, 36D, a customer administrator 36C, or a kiosk administrator 36D. The analytics users may be users that access the server 30, particularly the analytics repository module 33 and analytics reporting module 35. The customer administrator 36C may be an administrator accessing the server 30 to view, access, and control customer information. Customer information may include purchase and renting history, current renting information, customer location usage, and the like. The kiosk administrator 36A may be an administrator accessing the kiosk information, controlling the kiosk using the server 30, troubleshooting a kiosk, updating a kiosk, or the like. In a particular embodiment, the kiosk administrator 36A may be an operator manually working on the kiosk or removing spent or drained batteries. In this embodiment, the kiosk administrator 36A may have remote access to control the kiosk being operated on, to access data relating to the particular kiosk, to request control, such as an update, from the server 30, and to troubleshoot the kiosk.

Figure 4:
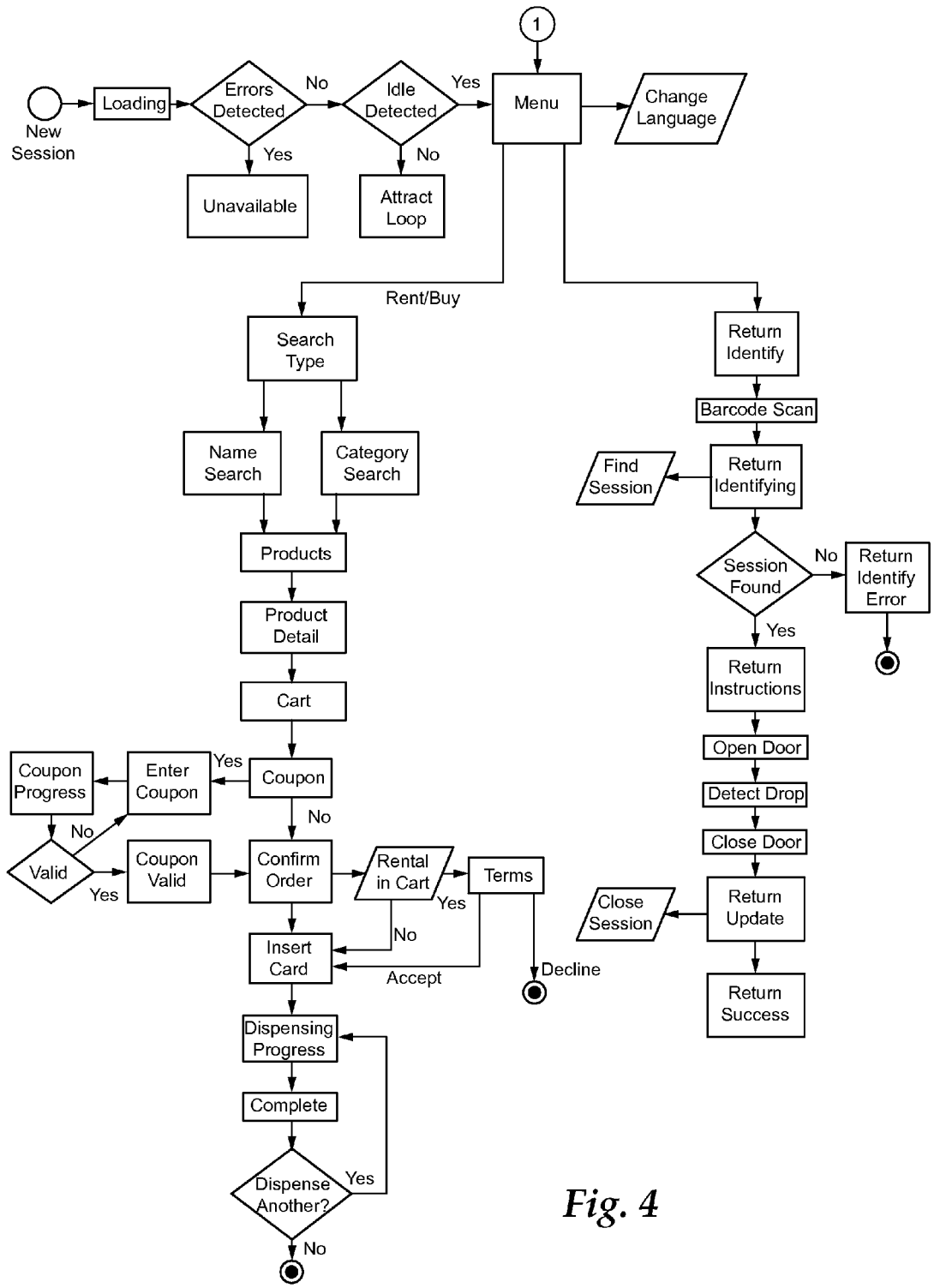
FIG. 4 provides a flow chart of an operation of an embodiment of the system.

FIG. 4 provides a flow chart of an embodiment of the user interface. The process begins when a customer initiates a new session. The kiosk system performs an error check and if any errors are detected in either its software or mechanical systems, it provides an output that errors are detected and that it is unavailable. If no errors are detected, the system performs an idle check using a timer. If the system does not receive any input from the user for a given time period, it may end the session and revert back to an attract loop on the display, or another off-line display process such as advertisements, blank screen, or the like. Assuming the customer provides progressive inputs, the system displays a menu. On this menu, a customer may opt to change the language, rent/buy, or return a rented item, among other things.

If a customer selects rent, buy, or rent/buy (depending on embodiment) the kiosk system enters the vending mode. In this mode, a customer may search in varying methods as described above, such as product name search or category search. The customer may then identify the particular product or products desired to be charged, view product details to confirm the correct battery pack and/or adapter, and then add the selected battery packs and/or adapters to a cart for checkout. If a user has a coupon or coupon code, it may be entered. The kiosk may process the coupon on its own, or may confirm coupon status with the server. If the coupon is valid, the discount is applied and the transaction continues. If the coupon is invalid, the interface prompts the customer to enter another coupon code or exit the coupon entry embodiment.

Once the customer is ready to check out, the kiosk system confirms their order and prepares for check out. In a rental embodiment, a customer may be provided with the rental terms that may be accepted or declined. If the terms are declined, the transaction is cancelled. If the terms are accepted, the system prompts the customer to pay with a credit card or similar electronic payment. Once payment is approved, the kiosk may dispense the selected battery packs and/or adapters, and then end the customer's transaction.

If the customer selects a return battery pack option, the kiosk system may initiate a return interface routine. Initially, the system prompts the customer to scan or otherwise input the rented battery pack and/or adapter. The kiosk system may then communicate with the server system to find the rental session corresponding to the rented item. The kiosk system may then receive the identified information from the server if found, or return an error message if it is not found. Assuming the rental information is found, the kiosk system displays return instructions on the display, and opens a return door or otherwise prompts the user to return the battery pack and/or adapter. Once the return is detected, the kiosk system may close the door, and update the server that the item has been returned to close the rental session. Finally, the kiosk may display that the return was successful to the customer.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A kiosk based battery rental system comprising:
a kiosk and a server in electronic communication with each other, and a charging unit configured to charge at least one of a plurality of battery packs;
wherein the kiosk comprises:
a computerized user interface module providing a user interface to a customer, the user interface module allowing a customer to identify one of the plurality of battery packs required to charge a device of the customer, the user interface module further configured to direct a customer to select a rental time period, pay for the identified battery pack, and to dispense the identified battery pack;
wherein the plurality of battery packs comprises battery packs of different configurations for charging different devices;
a dispensing structure allowing the identified battery pack to be removed from a vending rack and dispensed through the dispensing structure;
a return structure having an openable door and a sensor to identify when a battery pack has been received within the return structure;
a returned battery pack bin connected to the return structure, the returned battery pack bin sized to receive and store a returned battery pack, the returned battery pack bin being capable of being opened and accessed by a maintenance operator, the returned battery pack, once accessed by the maintenance operator being chargeable on the charging unit; and a communications unit capable of communicating information relating to the battery pack identified by the customer to the server, the information comprising an identification number of the identified battery pack, selected time period, the device of the customer, and a credit card information of the customer;

wherein the server comprises:

a core services module configured to receive the information communicated by the communications unit, and further configured to process credit card information and return a confirmation to the customer through the kiosk and computerized user interface module;

an administration repository module configured to store and receive information relating to a history of the renting of the plurality of battery packs, the core services module passing the identification number and a kiosk identification number identifying the kiosk to the administration repository module;

an analytics repository module configured to receive information from the core services module and configured to calculate and store analytics information regarding kiosk operation based on the information received by the core services module; and an administrator and analytics reporting module configured to provide a user interface and access to the server system, the administrator and analytics reporting module allowing an administrator to access data of the analytics repository, administration repository module, and the core services module; and wherein the core services module of the server is configured to charge the credit card of the customer based on the credit card information received from the communication unit, to begin a timer for the selected time period and, upon expiration of the selected time period charge the credit card of the customer again, and restart the timer for the selected time period.

2. The battery exchange service system of claim 1 wherein the core services module is configured to repeat charging the credit card at the expiration of the timer, and to repeat resetting the timer until the battery pack is returned by the customer.

3. The battery exchange service system of claim 1 wherein the plurality of battery packs comprises a plurality of batteries, and a plurality of different adapters, a first plurality of adapters of the plurality of different adapters configured to connect one of the plurality of batteries to a first device, and a second plurality of adapters of the plurality of different adapters configured to connect the one of the plurality of batteries to a second device.

4. The battery exchange service system of claim 1 wherein the plurality of battery packs comprises a first plurality of battery packs having a first mating protrusion configured to fit a first device, and a second plurality of battery packs having a second mating protrusion configured to fit a second device.

5. The battery exchange service system of claim 1 wherein the user interface is configured to prompt a user to select a rental time period to be one of hourly, half day, and daily.

6. The battery exchange service system of claim 1 wherein the rental time period is hourly.

7. The battery exchange service system of claim 1 wherein the rental time period is daily.

8. The battery exchange service system of claim 1 wherein each of the plurality of battery packs comprises a scannable identification code, and wherein the kiosk further comprises a scanner to scan and record the scannable identification code.

9. The battery exchange service system of claim 1 wherein the server is further configured to provide an indication to the operator that the battery pack has been returned, and to instruct the operator to receive the battery pack and recharge the battery pack.

10. The battery exchange service system of claim 1 wherein the charging unit in positioned within the kiosk.

11. The battery exchange service system of claim 1 wherein the charging unit is remote from the kiosk.

12. The battery exchange service system of claim 1 wherein the charging unit is integrated into the dispensing structure.

13. A kiosk based battery rental system comprising:

a kiosk and a server in electronic communication with each other, and a charging unit configured to charge at least one of a plurality of battery packs;

wherein the kiosk comprises:

a computerized user interface module providing a user interface to a customer, the user interface module allowing a customer to identify one of the plurality of battery packs required to charge a device of the customer, the user interface module further configured to direct a customer to select a rental time period, pay for the identified battery pack, and to dispense the identified battery pack;

wherein the plurality of battery packs comprises battery packs of different configurations for charging different devices;

a dispensing structure allowing the identified battery pack to be removed from a vending rack and dispensed through the dispensing structure;

a return structure having an openable door and a sensor to identify when a battery pack has been received within the return structure;

a battery replacement unit connected to the return structure, the replacement unit configured to automatically place the returned battery pack into the charging unit, the charging unit being within the kiosk;

a communications unit capable of communicating information relating to the battery pack identified by the customer to the server, the information comprising an identification number of the identified battery pack, selected time period, the device of the customer, and a credit card information of the customer;

wherein the server comprises:

a core services module configured to receive the information communicated by the communications unit, and further configured to process credit card information and return a confirmation to the customer through the kiosk and computerized user interface module;

an administration repository module configured to store and receive information relating to a history of the renting of the plurality of battery packs, the core services module passing the identification number and a kiosk identification number identifying the kiosk to the administration repository module;

an analytics repository module configured to receive information from the core services module and configured to calculate and store analytics information regarding kiosk operation based on the information received by the core services module; and an administrator and analytics reporting module configured to provide a user interface and access to the server system, the administrator and analytics reporting module allowing an administrator to access data of the analytics repository, administration repository module, and the core services module; and wherein the core services module of the server is configured to charge the credit card of the customer based on the credit card information received from the communication unit, to begin a timer for the selected time period and, upon expiration of the selected time period charge the credit card of the customer again, and restart the timer for the selected time period.

14. The battery exchange service system of claim 13 wherein, upon adequate charging of the returned battery on the charging unit, the battery replacement unit is configured to automatically move the returned battery pack into the vending rack.

15. The battery exchange service system of claim 13 wherein the core services module is configured to repeat charging the credit card at the expiration of the timer, and to repeat re-setting the timer until the battery pack is returned by the customer.

16. The battery exchange service system of claim 13 wherein the plurality of battery packs comprises a plurality of batteries, and a plurality of different adapters, a first plurality of adapters of the plurality of different adapters configured to connect one of the plurality of batteries to a first device, and a second plurality of adapters of the plurality of different adapters configured to connect the one of the plurality of batteries to a second device.

17. The battery exchange service system of claim 13 wherein the plurality of battery packs comprises a first plurality of battery packs having a first mating protrusion configured to fit a first device, and a second plurality of battery packs having a second mating protrusion configured to fit a second device.

18. The battery exchange service system of claim 13 wherein the user interface is configured to prompt a user to select a rental time period to be one of hourly, half day, and daily.

19. The battery exchange service system of claim 13 wherein each of the plurality of battery packs comprises a scannable identification code, and wherein the kiosk further comprises a scanner to scan and record the scannable identification code.

20. The battery exchange service system of claim 13 wherein the charging unit is part of the vending rack.

* * * * *